United States Patent
Yoshikawa

[11] Patent Number: 5,279,477
[45] Date of Patent: Jan. 18, 1994

[54] SOUND PRODUCING APPARATUS FOR SPINNING REEL
[75] Inventor: Osamu Yoshikawa, Sakai, Japan
[73] Assignee: Shimano, Inc., Osaka, Japan
[21] Appl. No.: 745,874
[22] Filed: Aug. 16, 1991
[30] Foreign Application Priority Data
Sep. 3, 1990 [JP] Japan ................ 2-93012[U]
[51] Int. Cl.⁵ ............................................. A01K 89/01
[52] U.S. Cl. ................................................... 242/306
[58] Field of Search ................. 242/296, 306, 307, 308
[56] References Cited
U.S. PATENT DOCUMENTS

| | | | |
|---|---|---|---|
| 1,621,003 | 3/1927 | Dodd | 242/307 X |
| 2,059,765 | 11/1936 | Adams | 242/307 X |
| 3,138,343 | 6/1964 | Henze | 242/308 |
| 3,223,349 | 12/1965 | Holahan | 242/306 X |
| 4,163,528 | 8/1979 | Egasaki et al. | 242/307 X |
| 4,168,041 | 9/1979 | Moosberg | 242/307 X |
| 4,173,317 | 11/1979 | Hamayasu et al. | 242/306 |
| 4,496,115 | 1/1985 | Kreft et al. | 242/306 |
| 5,007,602 | 4/1991 | Carlsson | 242/306 X |

Primary Examiner—Daniel P. Stodola
Assistant Examiner—Michael R. Mansen
Attorney, Agent, or Firm—Dickstein, Shapiro & Morin

[57] ABSTRACT

A round producing apparatus for a spinning reel includes a sound producing piece in the form of a leaf spring attached to a disk mounted on a spool shaft, and an annular toothed element supported by a spool for acting on a distal end of the sound producing piece to produce a clicking sound. The sound producing piece is cantilevered and extends from the disk along directions of rotation of the spool. A coil spring acts as a one-way clutch for allowing the annular toothed element to rotate only in a line unwinding direction of the spool.

6 Claims, 4 Drawing Sheets

SOUND PRODUCING APPARATUS FOR SPINNING REEL

BACKGROUND OF THE INVENTION

1. Field of the Invention

This invention relates to sound producing apparatus for use in spinning reels. More particularly, the invention relates to a sound producing apparatus for a spinning reel having a sound producing mechanism between a spool and a spool shaft for producing a clicking sound from rotation of the spool relative to the spool shaft, the sound producing mechanism including a sound producing piece and an engaging element for acting on the sound producing piece to generate the clicking sound.

2. Description of the Related Art

In a conventional sound producing apparatus for a spinning reel of this type, a sound producing piece attached to the spool shaft is extended to act on an engaging element attached to the spool. A clicking sound is generated with rotation of the spool in either of line winding and unwinding directions.

To generate the clicking sound with rotation in either direction of the spool, it is necessary for the sound producing piece to extend straight to the engaging element and also to have a sufficient thickness for strength.

Thus, although sufficient strength is secured, the clicking sound generated lacks in lilt. In this sense, there is room for improvement.

In order to produce a lilting sound, the sound producing piece needs to have an increased length. However, this is undesirable from the viewpoint of compactness of the spinning reel in that a large gap is formed between the engaging element and a mounting section of the sound producing piece.

SUMMARY OF THE INVENTION

The object of the present invention is to provide a sound producing apparatus for a spinning reel which produces a lilting sound by means of a compact sound producing mechanism.

A sound producing apparatus for a spinning reel according to the present invention includes a sound producing piece cantilevered and extending along directions of rotation of said spool to an engaging element, one of the sound producing piece and engaging element being supported by the spool, and a one-way clutch for allowing the sound producing piece or engaging element supported by the spool to rotate only in a line unwinding direction of the spool.

When the spool rotates in the line unwinding direction, the engaging element or sound producing piece rotates with the spool to produce a clicking sound. When the spool rotates in the opposite direction, the one-way clutch rotates freely to permit no relative rotation between the sound producing piece and engaging element. Thus, no clicking sound is produced.

A lilting clicking sound may be produced since the sound producing piece is cantilevered and extends a long distance along the rotating directions of the spool, compared with a sound producing piece extending straight toward the engaging element. This construction also allows the engaging element and sound producing piece to be disposed close to one another to achieve compactness. Further, since the one-way clutch prevents rotation of the sound producing piece relative to rotation of the spool opposite to the line unwinding direction, there is little likelihood of the sound producing piece becoming damaged or distorted by backward rotation of the spool. The sound producing piece may have a strength to readily produce the clicking sound.

Other features and advantages of the present invention will be apparent from the following description.

BRIEF DESCRIPTION OF THE DRAWINGS

The drawings show a sound producing apparatus of a spinning reel according to the present invention, in which.

DETAILED DESCRIPTION OF THE PREFERRED EMBODIMENT

A sound producing apparatus of a spinning reel according to the present invention will be described in detail with reference to the drawings.

Figure 1:
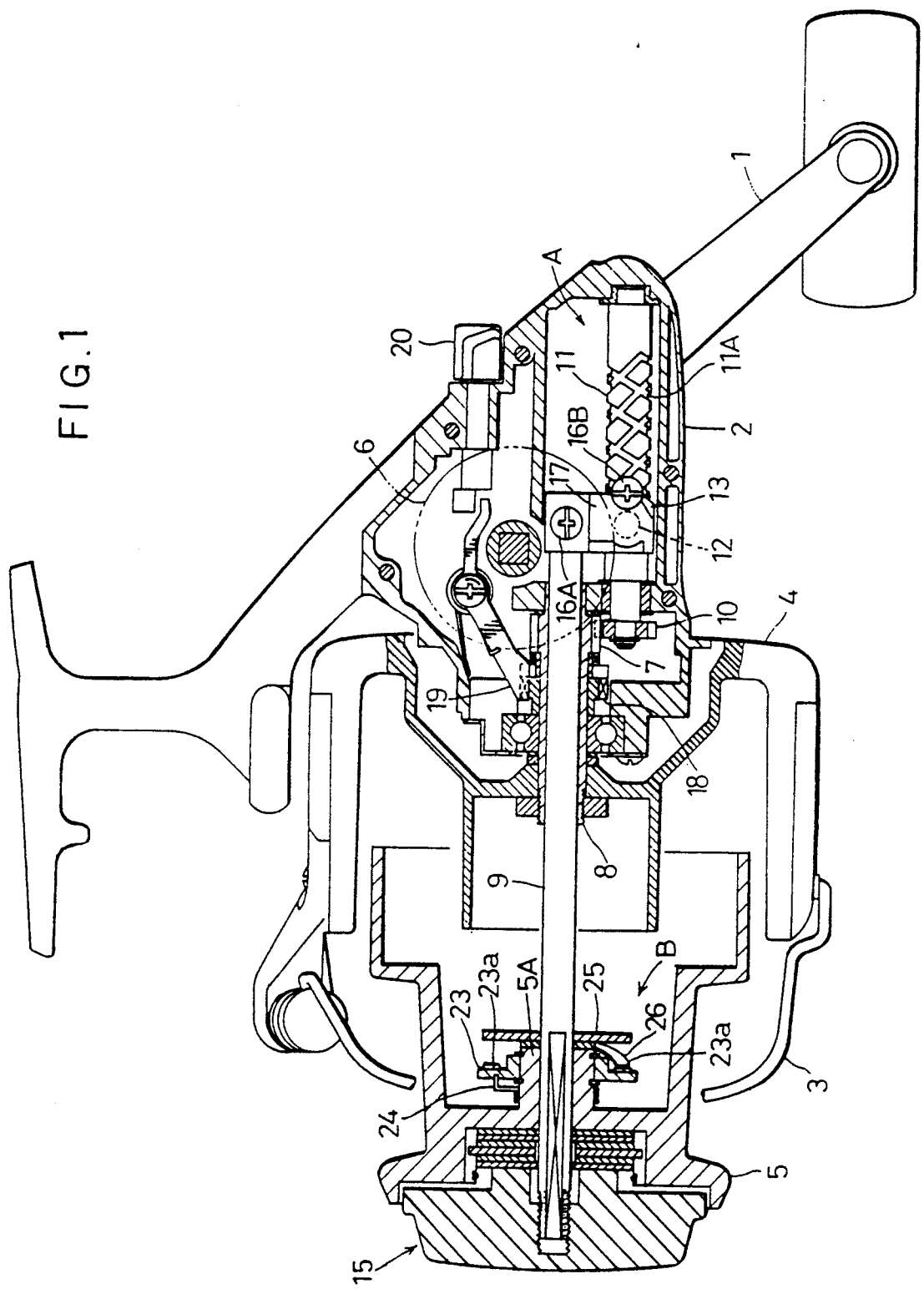
FIG. 1 is a side view in vertical section of the reel.

As shown in FIG. 1, a spinning reel includes a handle 1 connected to a reel body 2 which carries a rotor 4 having a bail arm 3 and a spool 5 in a forward portion thereof. The rotor 4 is driven by a transmission system including a drive gear 6 rotatable by the handle 1, a pinion gear 7 and a sleeve shaft 8. An oscillating mechanism A is provided to converting the drive received from the pinion gear 7 into backward and forward reciprocation for transmission to a spool shaft 9.

Figure 3:
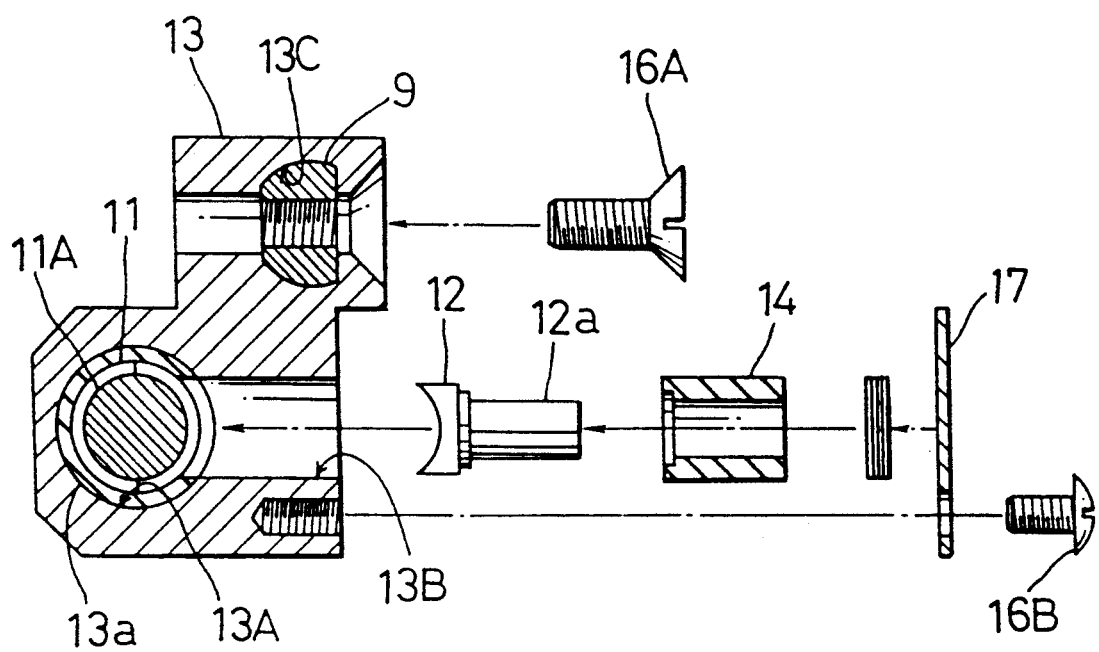
FIG. 3 is an exploded view in vertical section of an oscillating mechanism.

As shown in FIGS. 1 and 3, the oscillating mechanism A includes an input gear 10 meshed with the pinion gear 7, a screw shaft 11 carrying the input gear 10 on one end thereof, an element 12 engaging an endless helical groove 11A formed in the screw shaft 11, and a transmission member 13 for transmitting movement of the element 12 to the spool shaft 9. In order to mitigate a contacting and vibrating sound between the element 12 and the transmission member 13 supporting the element 12, a plastic collar 14 is fitted on a support pin 12a of the element 12 which prevents direct contact between the element 12 and transmission member 13.

The transmission member 13 defines a through bore 13A for receiving the screw shaft 11, a bore 13B extending perpendicular to the through bore 13A for receiving the element 12, and an engaging bore 13C also extending perpendicular to the through bore 13A for receiving a rear end of the spool shaft 9. The spool shaft 9 is held in position by a screw 16A, and the bore 13B is closed by a plate 17 secured by a screw 16B.

A plastic bushing 13a is press fit in the through bore 13A. The screw shaft 11 is supported at an end thereof through the bushing 13a which has a vibration absorbing function to suppress generation of vibrating sound.

The sleeve shaft 8 carries a ratchet wheel 18 fixed thereto. An arm 19 is movable by a control device 20 between a position to engage the ratchet wheel 18 and a position retracted therefrom.

A sound producing mechanism B operable with rotation of the spool 5 will be described next.

Figure 2:
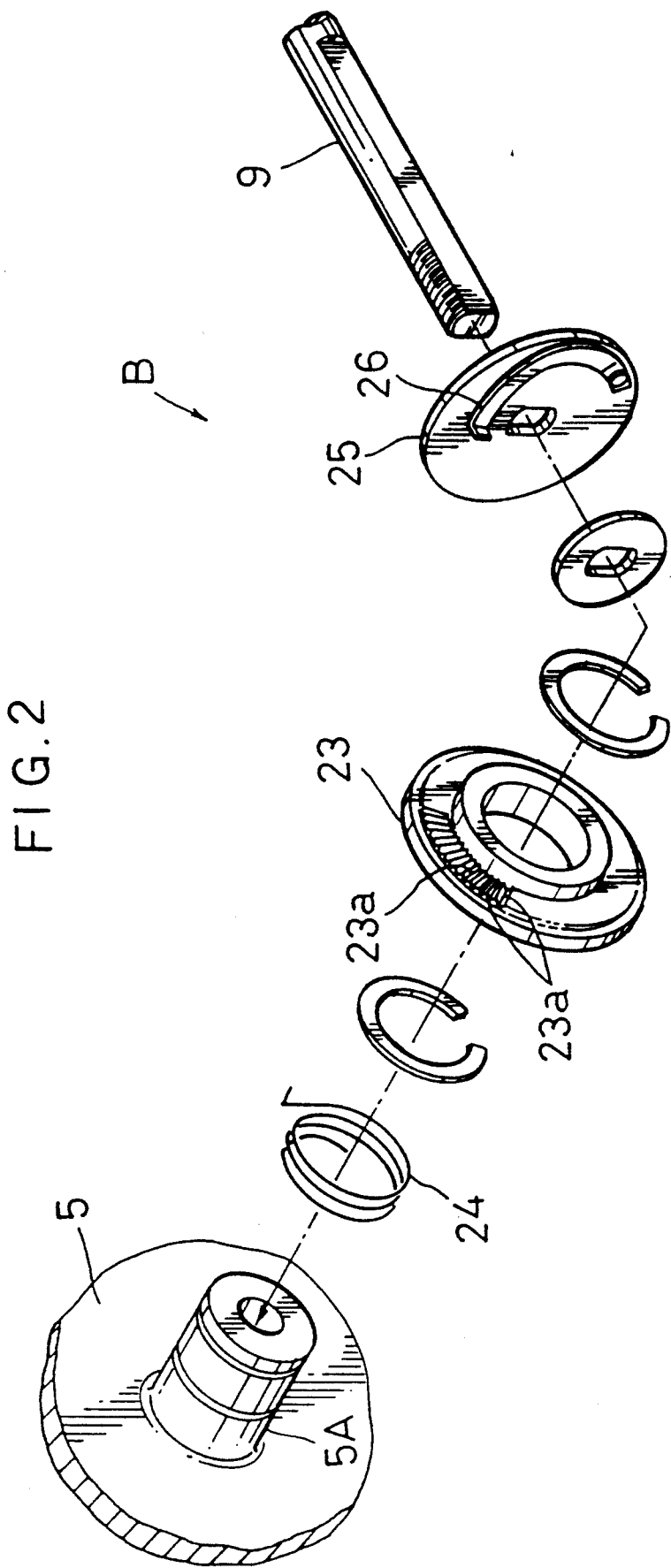
FIG. 2 is an exploded perspective view.

As shown in FIGS. 1 and 2, the spool 5 is rigidly connected to the spool shaft 9 by a drag device 15. The spool 5 does not rotate when a bait is thrown, but is rotatable in a line unwinding direction against the drag when a fish hooked applies a strong pull. On such an occasion, the sound producing apparatus produces a clicking sound. The spool 5 includes a boss 5A projecting rearwardly in an inner recess of a rear end thereof. A sound producing engaging element 23 defining sawtooth-like engaging grooves 23a is loosely fitted on the boss 5A. A coil spring 24 is mounted between the engaging element 23 and the boss 5A of the spool 5, with one end of the coil spring 24 fixed to the engaging element 23. When the spool 5 rotates in the line unwinding direction, the engaging element 23 rotates with the spool 5 through a tightening force of the coil spring 24. When the spool 5 rotates in the line winding direction, the engaging element 23 does not rotate with the spool 5 because of relaxation of the coil spring 24. Thus, the coil spring 24 acts as a one-way clutch.

As shown in FIG. 2, the spool shaft 9 carries a disk 25 fixed thereto and opposed to the engaging element 23. The disk 25 fixedly carries a sound producing piece 26 in the form of a leaf spring. The sound producing piece 26 is cantilevered and extends along the directions of spool rotation, with a distal end of the sound producing piece 26 located downstream with respect to the rotation in the line unwinding direction of the spool 5. The distal end of the sound producing piece 26 is engaged with the engaging grooves 23a of the engaging element 23. With this construction, a clicking sound is produced by rotation of the engaging element 23 resulting from rotation of the spool 5. Lilting clicks are produced since the sound producing piece 26 in the form of a leaf spring is cantilevered and extends a long distance in the line unwinding direction of the spool 5. In addition, the one-way clutch 24 protects the sound producing piece 26 from damage caused by backward rotation of the engaging element 23.

Figure 4:
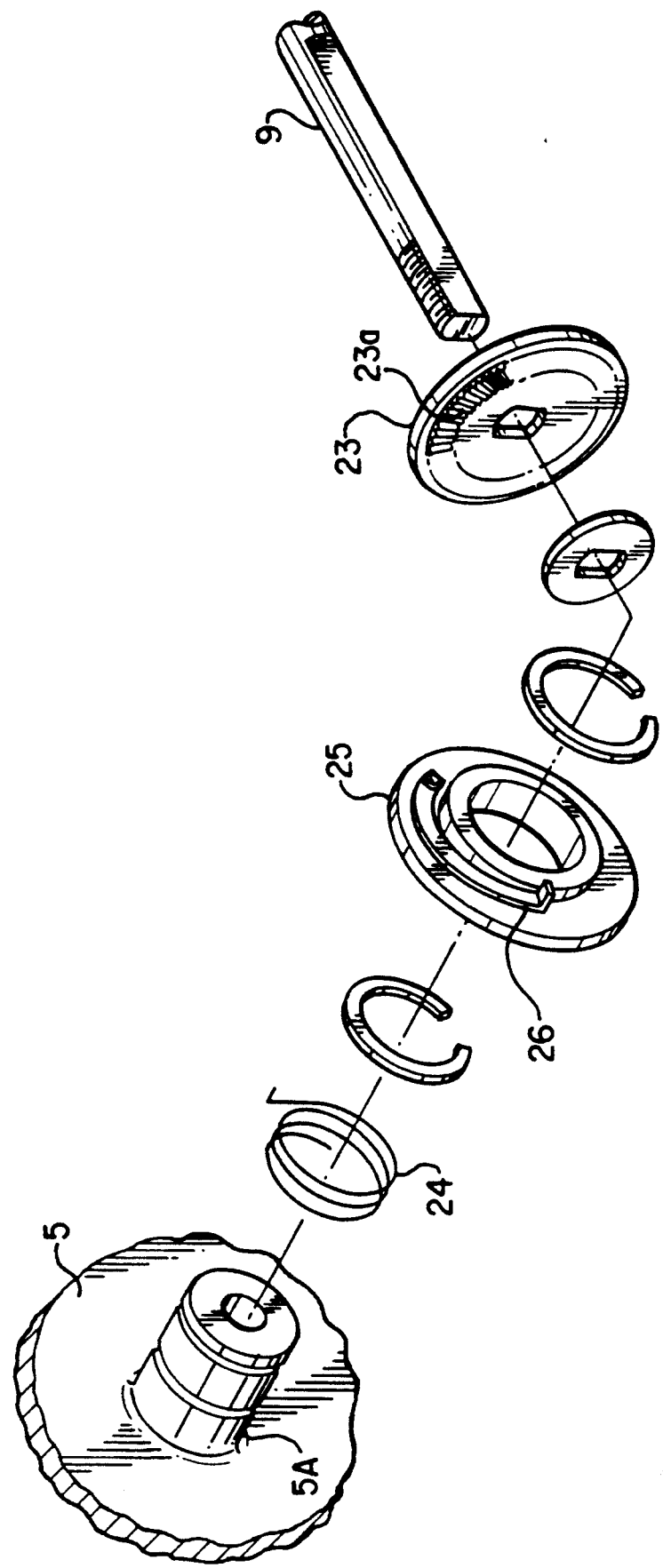
FIG. 4 is an exploded perspective view of a second embodiment.

The foregoing embodiment of the present invention may be modified as follows:

(a) The engaging element 23 and sound producing piece 26 may be exchanged with respect to the supports thereof as seen in FIG. 4.

(b) The sound producing piece 26 need not be in the form of a leaf spring, but may be a different resilient element such as a piano wire or a less resilient material such as a plastic plate.

What is claimed is:

1. A sound producing apparatus for a spinning reel with a cup-shaped spool having a bottom and a side wall, said apparatus comprising:

a cyclindrical boss portion projecting from said bottom of said spool into a space formed by said bottom and said side wall of said spool;

a spool shaft penetrated through said bottom of said spool;

an engaging element mounted on an exterior circumference of said boss normal with respect to an axis of said boss portion, said engaging element being capable of rotating with respect to said boss portion and being axially fixed to said boss portion, and a rearwardly facing surface of said engaging element having a series of engaging serrations at an outer periphery thereof;

a disk member facing said engaging element, said disk member being mounted on said spool shaft normal with respect to said spool shaft, said disk member being rotationally and axially fixed to said spool shaft;

a sound producing plate fixed by an end thereof on a surface of said disk member facing said engaging element, said sound producing plate extending along said engaging serrations of said engaging element, another end of said sound producing plate being a free end and urged onto said engaging serrations;

a one-way clutch disposed between said engaging element and said boss portion, said one-way clutch rotating said engaging element in accordance with rotation of said spool only when said spool rotates in a line unwinding direction;

wherein said boss portion, said engaging element and said disk member are housed in said space formed by said bottom and said side wall of said spool.

2. A sound producing apparatus for a spinning reel of claim 1 wherein said one-way clutch is a coil spring having a substantially annular shape.

3. A sound producing apparatus for a spinning reel of claim 2 wherein one end of said coil spring is mounted on said boss portion and another end of said coil spring is fixed to said engaging element at a position radially outward of said boss position.

4. A sound producing apparatus for a spinning reel with a cup-shaped spool having a bottom and a side wall, said apparatus comprising:

a cylindrical boss portion projecting from said bottom of said spool into a space formed by said bottom and said side wall of said spool;

a spool shaft penetrated through said bottom of said spool;

an engaging element mounted on said spool shaft normal with respect to said spool shaft, said engaging element being rotationally and axially fixed to said spool shaft, and a frontwardly facing surface of said engaging element having a series of engaging serrations at an outer periphery thereof;

a disk member facing said engaging element, said disk member being mounted on an exterior circumference of said boss portion with an attitude normal with respect to an axis of said boss portion, said disk member being capable of freely rotating with respect to said boss portion and being axially fixed to said boss portion;

a sound producing plate fixed by an end thereof to a surface of said disk member facing said engaging element, said sound producing plate extending along said engaging serrations of said engaging element, another end of said sound producing plate being a free end and urged onto said engaging serrations;

a one-way clutch disposed between said disk member and said boss portion, said one-way clutch rotating said disk member in accordance with rotation of said spool only when said spool rotates to a line unwinding direction;

wherein said boss portion, said engaging element and said disk member are housed in a space formed by said bottom and said side wall of said spool.

5. A sound producing apparatus for a spinning reel of claim 4 wherein said one-way clutch is a coil spring having a substantially annular shape.

6. A sound producing apparatus for a spinning reel of claim 5 wherein one end of said coil spring is mounted on said boss portion and another end of said coil spring is fixed to said disk member at a position radially outward of said boss position.

* * * * *